United States Patent [19]

Seino

[11] Patent Number: 5,408,544
[45] Date of Patent: Apr. 18, 1995

[54] OPTICAL MODULATOR FOR PRODUCING A CONTROLLABLE CHIRP

[75] Inventor: Minoru Seino, Kawasaki, Japan

[73] Assignee: Fujitsu Limited, Kanagawa, Japan

[21] Appl. No.: 268,175

[22] Filed: Jun. 29, 1994

[30] Foreign Application Priority Data

Dec. 28, 1993 [JP] Japan .................. 5-337222

[51] Int. Cl.⁶ .............................. G02B 6/10
[52] U.S. Cl. .......................... 385/3; 385/4; 385/14; 385/2
[58] Field of Search ............ 385/3, 1, 2, 4, 8, 9, 385/12, 14, 15, 31, 40

[56] References Cited

U.S. PATENT DOCUMENTS

| | | | |
|---|---|---|---|
| 5,074,631 | 12/1991 | Hamano et al. | 385/3 |
| 5,208,697 | 5/1993 | Schaffner et al. | 385/3 X |
| 5,278,924 | 1/1994 | Schaffner | 385/3 |
| 5,359,680 | 10/1994 | Riviere | 385/3 X |

FOREIGN PATENT DOCUMENTS 4-14010  1/1992  Japan .

*Primary Examiner*—Rodney B. Bovernick
*Assistant Examiner*—Phan T. H. Palmer
*Attorney, Agent, or Firm*—Armstrong, Westerman, Hattori, McLeland and Naughton

[57] ABSTRACT

An optical modulator comprises an optical waveguide provided on an electro-optic substrate and formed of a first region for optical phase modulation and a second region for optical amplitude modulation cascaded with each other on the substrate, a signal electrode covering the optical waveguide for the first and second regions, and a ground electrode covering a surface of the substrate for the first and second regions, wherein the signal electrode includes an electrode strip extending on the surface of the substrate to continuously cover the optical waveguide from the first region to the second region, and wherein the ground electrode includes an electrode strip extending from the first region to the second region and covering the optical waveguide only in the first region.

19 Claims, 12 Drawing Sheets

OPTICAL MODULATOR FOR PRODUCING A CONTROLLABLE CHIRP

BACKGROUND OF THE INVENTION

The present invention generally relates to optical modulators and more particularly to an optical modulator suitable for use in an optical telecommunication system that uses optical fibers.

In the long distance optical telecommunication systems that use optical fibers, there arises a problem known as chirping, which is a minute time-dependent fluctuation of wavelength in the modulated optical beams. Such a chirping occurs as a result of self-phase-difference-modulation in the optical fibers, while such a self-phase-difference-modulation occurs each time the optical beam is amplified by optical amplifiers.

With recent tendency of increased modulation frequency that now reaches the order of GHz, the chirping provides a serious effect on the quality of the optical beams transmitted along the optical fibers.

In order to eliminate or minimize the chirping and to improve the quality of the optical beams, it is considered to provide an intentional chirping to the optical beams by way of optical modulators such that the chirping caused in an optical beam as it is propagated through an optical fiber, is effectively canceled out.

Thus, there is a demand for an optical modulator that can control the chirping or wavelength shift as desired.

FIG.1 shows the construction of an optical modulator 10 disclosed in the Japanese Laid-open Patent Publication 4-14010.

Referring to FIG. 1, the optical modulator 10 includes a LiNbO$_3$ substrate 11 on which an optical waveguide modulator 12 for amplitude modulation and an optical waveguide modulator 13 for phase modulation are provided such that the optical waveguide modulator 13 is cascaded behind the optical waveguide modulator 12.

The optical waveguide modulator 12 includes, on the substrate 11, branched optical waveguides 14 and 15 merged with each other at respective first ends and respective second, opposite ends, wherein a signal electrode 16 is provided on the optical waveguide 14, and a signal electrode 17 is provided on the optical waveguide 15.

The optical waveguide modulator 13, on the other hand, includes an optical waveguide 18 on the substrate 11. Further, a signal electrode 19 and a ground electrode 20 are provided.

Further, the optical modulator 10 of FIG.1 includes signal cables 21 and 22 respectively for supplying electric signals to the foregoing signal electrodes 16 and 19, and a signal source 23 for producing the foregoing electric signals. It should be noted that the electric signal produced by the signal source 23 is supplied directly to the electrode 16 by way of the signal cable 21, while the signal electrode 19 is supplied with the signal from the signal source 23 by way of the signal cable 22, after amplification by an amplifier 24 and processing by an adjustment unit 25. In the illustrated example, a delay element 26 is further included between the adjustment unit 25 and the cable 22. Further, it will be noted that a terminating resistor $R_T$ is provided between the electrode 16 and the electrode 17 and between the electrode 19 and the electrode 20.

In operation, an input optical beam is supplied to a first end of the substrate 11 as indicated in FIG.1 and the optical beam thus supplied is guided along respective paths of the optical waveguides 14 and 15. While propagating through the optical waveguides 14 and 15, the optical beam experiences positive and negative phase modulation in response to the electric signal applied across the electrodes 16 and 17, and these phase differences result in an amplitude modulation at the junction of the two waveguides 14 and 15. Further, the optical beam thus subjected to the amplitude modulation then enters to the optical waveguide 18 and experiences a phase modulation in response to the electric signal applied across the electrodes 19 and 20. The optical beam thus processed is then emitted at a second end of the substrate 11 as indicated.

It should be noted that the optical modulator 10 having such a construction is subjected to an adjustment process, in which the adjustment unit 25 is set such that the optical modulator 10 provides a desired chirp for canceling the chirp of optical beams in the optical fiber. In the adjustment process, the optical waveguide modulators 12 and 13 are operated independently, after the fabrication of the optical modulator 10 is completed, by using an external circuit, while such an adjustment process has to be conducted at the site where the optical modulator 10 is used, in the state that the optical modulator 10 is connected to optical fiber cables. However, such an adjustment process at the site of use of the optical modulators takes a considerable time. Further, it should be noted that the setting of the adjustment unit 25 is fixed once the optical modulator 10 is set to provide the desired chirp, while it is necessary to construct the adjustment unit 25 to allow such an adjustment. Obviously, this is a disadvantage in view of mass production of the optical modulator, and in view of the number of the steps included in the fabrication process. Thus, the conventional optical modulator 10 has suffered from the problem of high cost. Further, the conventional optical modulator 10 has a drawback in the point that the timing adjustment for supplying the electric signals to the optical waveguide modulator 12 and to the optical waveguide modulator 13, is difficult. In addition to the foregoing problems of large number of parts required and expensive construction of the optical modulator, the optical modulator 10 has a drawback in that the construction provided on the substrate 11 for the connection of the external circuit substantially reduces the area used for providing the electrodes 16, 17 or 19, 20. It should be noted that the area of the substrate 11 is substantially limited. As a result, there is a tendency that the electrodes cause an interference on the substrate 11. Further, the reduced separation between the electrodes invites an increased drive voltage of the device.

SUMMARY OF THE INVENTION

Accordingly, it is a general object of the present invention to provide a novel and useful optical modulator wherein the foregoing problems are eliminated.

Another and more specific object of the present invention is to provide an optical modulator for providing a desired chirp in an optical beam with a simple construction.

Another object of the present invention is to provide an optical modulator, comprising:
 a substrate showing an electro-optic effect;
 an optical waveguide provided on said substrate for guiding an optical beam therethrough, said optical waveguide including a first region and a second, different region cascaded with each other for consecutively passing said optical beam;

signal electrode means provided on said substrate in the vicinity of said optical waveguide for receiving an electric signal, said signal electrode means including a first region and a second, different region respectively corresponding to said first and second regions of said optical waveguide;

ground electrode means provided on said substrate in separation from said signal electrode means, said ground electrode including a first region and a second, different region respectively corresponding to said first and second regions of said optical waveguide;

said first region of said optical waveguide, said first region of said signal electrode means, and said first region of said ground electrode means forming an optical amplitude modulator for modulating an amplitude of said optical beam propagating through said optical waveguide;

said second region of said optical waveguide, said second region of said signal electrode means and said second region of said ground electrode means forming an optical phase modulator for modulating a phase of said optical beam propagating through said optical waveguide;

said second region of said signal electrode means having a size, along said optical waveguide, corresponding to a desired magnitude of chirp caused in said optical beam by said optical modulator;

said signal electrode means comprising an electrode strip extending continuously form said first region to said second region of said signal electrode means.

According to the present invention, it is possible to set the magnitude of the chirp achieved by the optical modulator by merely setting the length of the second region of the signal electrode means and the length of the second region of the corresponding ground electrode means, without providing additional circuitry for adjusting the chirp. By providing a single signal electrode strip as the signal electrode means, one can reduce the number of the pad region of the signal electrode on the substrate for external contact, to one. As a result, the area of the substrate available for the electrode strip increases, and one can increase the length of the electrode. Such an increase in the electrode length contributes to the reduction of the drive voltage of the optical modulator. Further, one can eliminate the complicated process for adjusting the timing of the electric signal applied to the signal electrode means.

In a preferred embodiment of the present invention, said electrode strip comprises a traveling-wave electrode extending continuously between a first end included in said first region of said signal electrode means and a second end included in said second region of said signal electrode means, a terminating resistance provided at said first end of said traveling-wave electrode in connection to said ground electrode means, and a terminal strip provided at said second end of said traveling-wave electrode for receiving said electric signal. By configuring the electrode strip as set forth above, the electric signal is applied directly to the region of the optical waveguide forming the optical phase modulator, with little attenuation, and the optical modulator produces a large chirp.

In another preferred embodiment of the present invention, said optical waveguide further includes a third region adjacent to said first region of said optical waveguide at a side opposite to said second region of said optical waveguide, said signal electrode means includes a third region adjacent to said first region of said signal electrode means at a side opposite to said second region of said signal electrode means, and said ground electrode means includes a third region adjacent to said first region of said ground electrode means at a side opposite to said second region of said ground electrode means, wherein said third region of said optical waveguide, said third region of said signal electrode means and said third region of said ground electrode means form a second optical phase modulator. According to the present invention, the area of the substrate is used efficiently and the optical modulator operates with a reduced drive voltage.

In another preferred embodiment of the present invention, said optical waveguide includes first and second branches merging with each other at respective first and second ends, said first and second branches being included in said first region of said optical waveguide, said electrode strip forming said signal electrode means includes a first portion extending over said first branch of said optical waveguide and a second portion continuing to said first portion and extending over said second region of said optical waveguide, said first and second portions thereby forming a first electrode strip, said signal electrode means further including a second, different electrode strip extending over said second branch of said optical waveguide in said first region of said optical waveguide, and said ground electrode means comprises a first electrode strip extending along said first electrode strip of said signal electrode means from said first portion to said second portion of said first electrode strip, and a second electrode strip extending along said second electrode strip of said signal electrode means in correspondence to said first region of said signal electrode strip. According to the present invention, one can induce a large chirp in the optical beam transmitted through said optical waveguide, by applying an electric signal to said first and second electrode strips of said signal electrode means while using a small magnitude for the electric signal. For this purpose, one may employ a signal source provided such that the signal source supplies said electric signal to said first and second electrode strips of said signal electrode means with mutually opposite phases.

In another preferred embodiment of the present invention, said optical waveguide includes a third region adjacent to said first region of said optical waveguide at a side opposite to said second region of said optical waveguide, said first electrode strip of said signal electrode means further includes a third portion adjacent to and in continuation with said first portion at a side opposite to said second portion of said first electrode strip, such that said third portion of said electrode strip covers said third region of said optical waveguide, said ground electrode means extends along said first electrode strip of said signal electrode means from said first portion to said third portion of said first electrode strip. According to the present invention, one can induce a large chirp with a reduced magnitude of the electric signal applied to said signal electrode means.

In another preferred embodiment of the present invention, said optical waveguide includes first and second branches merging with each other at respective first and second ends, said first and second branches being included in said first region of said optical waveguide, said optical waveguide further including a third region adjacent to said first region of said optical waveguide at a side opposite to said second region of said optical waveguide, said electrode strip forming said signal electrode means includes a first portion extending over said first branch of said optical waveguide and a second portion extending over said second region of said optical waveguide, said first and second portions thereby forming a first electrode strip, said signal electrode means further including a second, different electrode strip including a first portion extending over said second branch of said optical waveguide in said first region of said optical waveguide and a second portion extending over said third region of said optical waveguide, said ground electrode means comprises a first electrode strip extending along said first electrode strip of said signal electrode means from said first portion to said second portion of said first electrode strip, and a second electrode strip extending along said second electrode strip of said signal electrode means from said first portion to said second portion of said second electrode strip, wherein said second portion of said first electrode strip and said second portion of said second electrode strip have an identical length. According to the present invention, one can set the chirp of the optical modulator to be zero by applying electric signals to the first and second electrode strips with the same magnitude. In this case, the magnitude of chirp is controlled as desired in response to the electric signal about a zero chirp state. Further, by setting the length of the second portion of the first electrode strip and the second portion of the second electrode strip to be different, one obtains a predetermined chirp when the electric signals supplied to the first and second electrode strips are set to have the same magnitude. In this case, it should be noted that the phase modulator formed in the second region of the optical waveguide and the phase modulator formed in the third region of the optical waveguide act oppositely when forming the chirp.

Other objects and further features of the present invention will become apparent from the following detailed description when read in conjunction with the attached drawings.

DETAILED DESCRIPTION OF PREFERRED EMBODIMENTS

Figure 2:
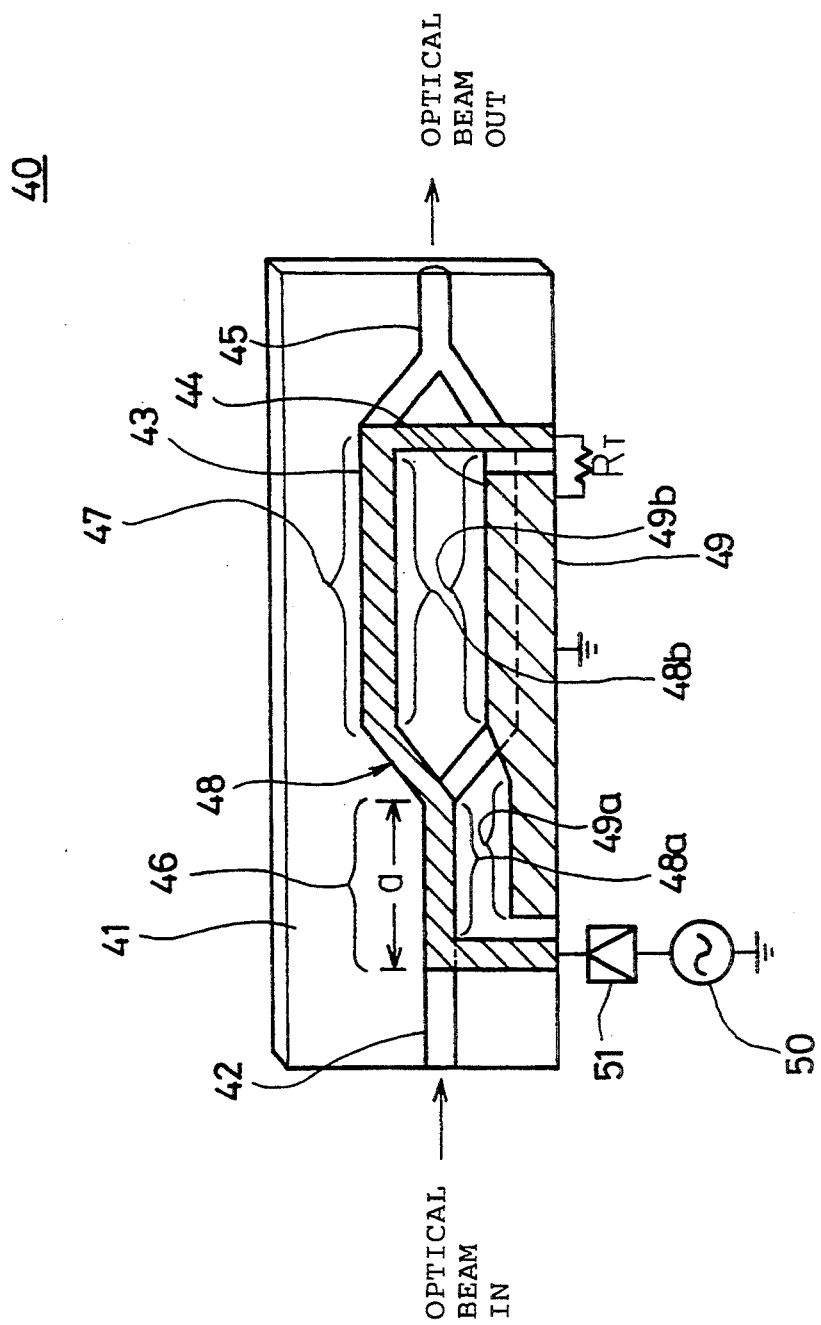
FIG. 2 is a diagram showing the construction of an optical modulator according to a first embodiment of the present invention.

FIG. 2 shows an optical modulator 40 according to a first embodiment of the present invention, wherein the optical modulator 40 is designed to provide a chirp $\alpha_1$.

Referring to FIG. 2, the optical modulator 40 includes a substrate of Z-cut LiNbO$_3$ on which an optical waveguide is formed. The optical waveguide includes a first region 42 and a second region 45, with intervening optical waveguide branches 43 and 44 that merge at respective ends. Thus, the branches 43 and 44 merge each other at a first end that is connected to the waveguide region 42. Similarly, the branches 43 and 44 merge each other at a second, opposite end that is connected to the waveguide region 45. Thus, the optical waveguide regions 42 and 45 as well as the optical waveguide branches 43 and 44 form a Mach-Zehnder interferometer on the surface of the substrate 41.

In correspondence to the region 42 and the branch 43 of the optical waveguide, there is provided a signal electrode strip 48 on the substrate 41 so as to cover the optical waveguide underneath, wherein the signal electrode strip 48 extends continuously from the region 42 to the branch 43. Further, there is provided a ground electrode 49 on the surface of the substrate 41 such that the ground electrode covers the other optical waveguide branch 44. The ground electrode 49 further extends to the left in FIG. 2 along the optical waveguide region 42, while the ground electrode 49 does not cover the optical waveguide 42. It should be noted that the signal electrode strip 48 includes a terminal pad region 48x at an end thereof, and an electric signal is supplied to the signal electrode strip 48 at the terminal pad region 48x from an electric signal source 50 via an amplifier 51. On the other hand, the ground electrode 49 is connected to the ground. Further, the opposite end of the signal electrode strip 48 forms another, second terminal pad 48y, and a terminating resistance $R_T$ is connected between the second terminal pad 48y and the ground electrode 49. Thus, the signal electrode strip 48 and the cooperating ground electrode form a traveling-wave electrode.

In the foregoing construction of the optical modulator, it should be noted that the signal electrode strip 48 includes an electrode portion 48a covering the optical waveguide region 42 with a length a and an electrode portion 48b covering the optical waveguide branch 43. Similarly, the ground electrode 49 includes an electrode portion 49a extending along the electrode portion 48a with a spatial offset therefrom and an electrode portion 49b that covers the optical waveguide branch 44. Thereby, the electrode portion 48a and the electrode portion 49a form an optical phase modulator 46 together with the portion of the optical waveguide region 42 locating underneath the electrode portion 48a. On the other hand, the electrode portion 48b and the electrode portion 49b form an optical amplitude modulator 47 together with the optical waveguide branches 43 and 44.

Next, the operation of the optical modulator 40 will be described.

Typically, the electric signal source 50 supplies a microwave signal having a frequency in the order of GHz to the signal electrode 48 as indicated in FIG. 2. As a result, the optical beam incident to the optical waveguide region 42 from a laser source (not shown) experiences a phase modulation in the optical phase modulator 46. The optical beam thus subjected to the phase modulation then proceeds from the waveguide region 42 to the optical waveguide branches 43 and 44 forming the optical amplitude modulator 47, and the optical beam experiences an amplitude modulation. Associated with the amplitude modulation, there occurs a slight phase modulation also in the optical beam. It should be noted that such a phase modulation occurs in response to the rise and fall of the microwave signal pulse. As a result of the amplitude modulation, a modulated optical beam is obtained with a desired chirp $\alpha_1$ in correspondence to the foregoing phase modulation in the optical phase modulator 46 and also in the optical amplitude modulator 47.

In the optical modulator 10, it should be noted that the magnitude of the chirp $\alpha_1$ is determined as desired by setting the length a of the optical phase modulator 46. Thus, when designing a new optical modulator 10, the necessary magnitude of chirp $\alpha_1$ is evaluated, and the length a is calculated based upon the desired chirp $\alpha_1$ thus evaluated. Once the length a is determined, the optical modulator 10 is mass produced.

Figure 1:
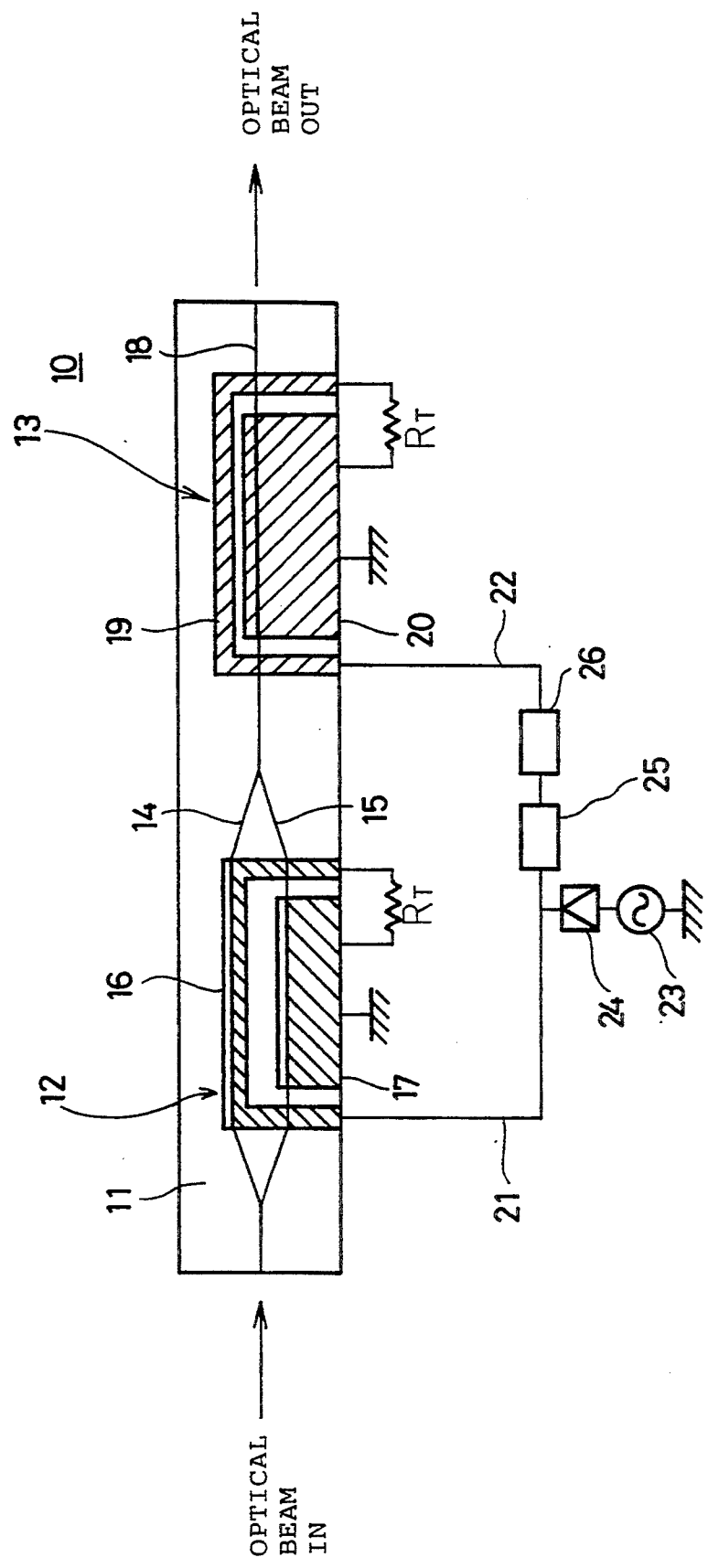
FIG. 1 is a diagram showing the construction of a conventional optical modulator.

It should be noted that one can achieve positive as well as negative chirp $\alpha_1$ in the optical modulator 10 of the present invention. It should be noted that the Mach-Zehnder interferometer such as the one shown in FIG. 1 changes the optical output periodically with increasing voltage signal applied to the optical amplitude modulator and operates bistably such that the optical output is switched between the maximum level and the minimum level. When causing such a bistable transition of the optical output, there are two possibilities, one being a mode for increasing the optical power from the minimum power state to the maximum power state with increase of the signal voltage, the other being a mode for decreasing the optical power with increase of the signal voltage, from the maximum power state to the minimum power state. By selecting one of the foregoing two modes, one can induce a positive chirp $+\alpha_1$ as well as a negative chirp $+\alpha_1$ as desired. In any of these cases, the absolute magnitude of the chirp is determined by setting the length a of the optical phase modulator 46.

Figure 3:
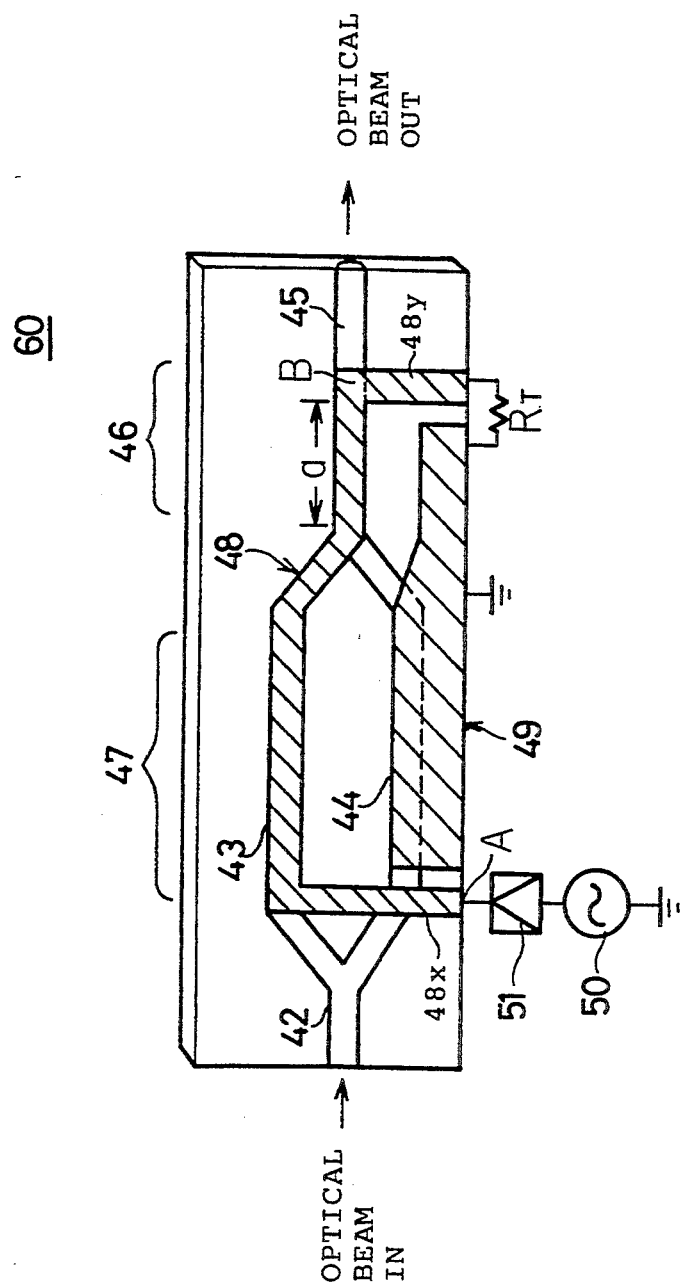
FIG. 3 is a diagram showing the construction of an optical modulator according to a second embodiment of the present invention.

FIG. 3 shows an optical modulator 60 according to a second embodiment of the present invention. In FIG. 3, those parts corresponding to the parts described already with reference to FIG. 2 are designated by the same reference numerals.

In the optical modulator 60, it should be noted that the optical phase modulator 46 and the optical amplitude modulator 47 are disposed oppositely with respect to the direction of propagation of the optical beam through the optical path. Thus, the incident optical beam is first amplified by the optical amplitude modulator 47 and experiences the phase modulation in the optical phase modulator 46 after the modulation in the optical amplitude modulator 47.

Further, it will be noted that the electrodes 48 and 49, supplied with the electric signal at the terminal 48x corresponding to the upstream side of the optical path carrying the optical beam and the terminating resistance $R_T$ at the opposite terminal 48y corresponding to the downstream side of the optical path, form a traveling-wave electrode similarly to the first embodiment shown in FIG. 2.

In such a construction of the electrode, on the other hand, the electric signal supplied to the optical phase modulator 46 at the upstream side terminal experiences a substantial attenuation as it is propagated along the electrode 48 through the optical amplitude modulator 47. Thus, the depth of modulation achieved by the optical phase modulator 46 is generally much smaller than the optical modulator 40 of FIG. 2 in which the electric signal is applied directly to the optical phase modulator 46. Thus, the optical modulator 60 of the present invention, even when fabricated with the same size for each of the parts as the optical modulator 40 of FIG. 2, shows a substantially different operational characteristic characterized by the small magnitude of chirp as compared with the optical modulator 40. In the trade off, the microwave signal is supplied directly to the optical amplitude modulator 47 without substantial attenuation. Thus, the optical modulator 60 of the present embodiment operates with a reduced drive voltage.

Thus, by choosing one of the optical modulators of the first and second embodiments and by choosing two optically bistable operational modes, one obtains at least four alternatives designs of the optical system that uses the optical modulator of the present invention. This number of options increases twice when the sign of the chirp is taken into consideration.

Figure 4:
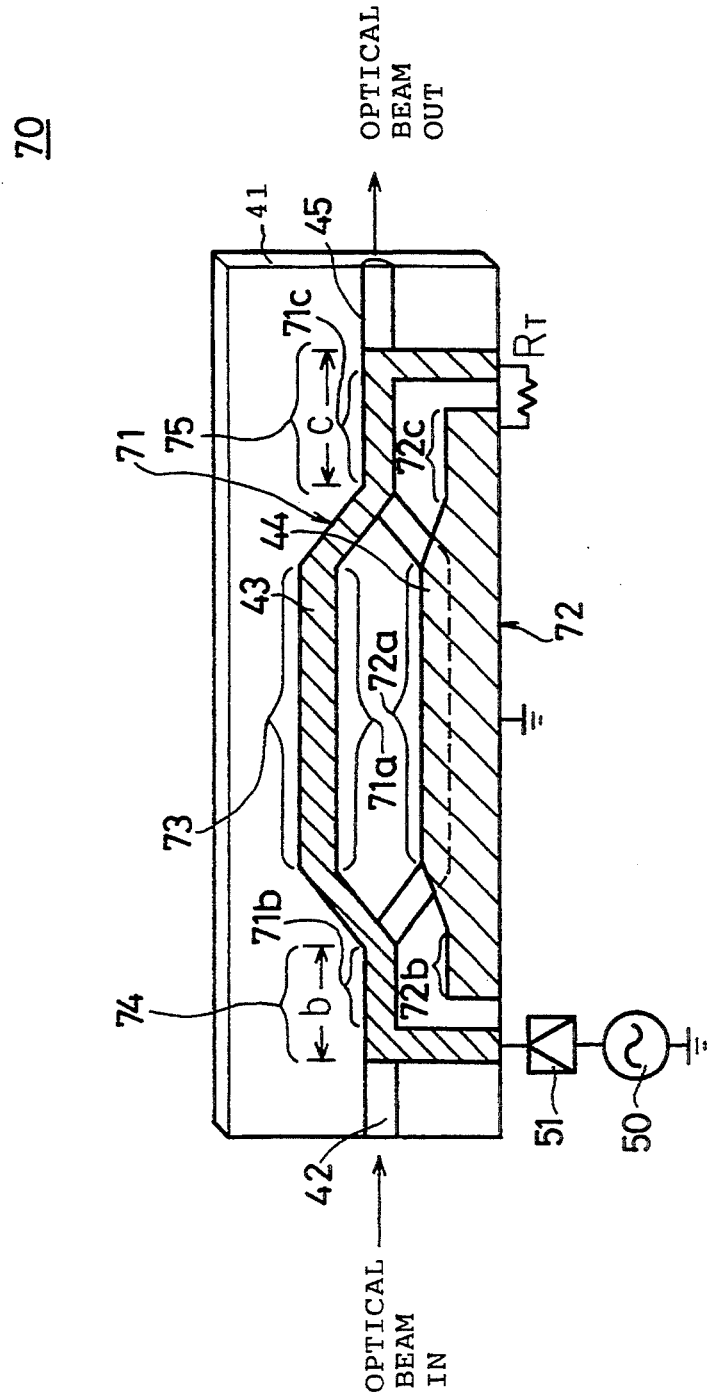
FIG. 4 is a diagram showing the construction of an optical modulator according to a third embodiment of the present invention.

FIG. 4 shows an optical modulator 70 according to a third embodiment of the present invention. In FIG. 4, those parts corresponding to the parts described previously are designated by the same reference numerals.

Referring to FIG. 4, the optical modulator 70 includes a signal electrode 71 and a ground electrode 72 both extending over the surface of the substrate 41, wherein the signal electrode 71 extends over the optical waveguide region 42 and the optical waveguide branch 43 and reaches the optical waveguide region 45. Thus, the signal electrode 71 includes a first portion 71b covering the optical waveguide region 42, a second portion 72a covering the optical waveguide branch 43, and a third portion 71c covering the optical waveguide 45, wherein the first portion 71b of the signal electrode 71 has a length b. Similarly, the third portion 71c has a length c.

The ground electrode 72 extends, on the other hand, over the substrate 41 adjacent to the signal electrode 71 with a separation therefrom, wherein the ground electrode 72 includes a first portion 72b covering the surface of the substrate 41 at a region adjacent to the first portion 71b of the signal electrode 71, a second portion 72a covering the optical waveguide branch 44 and extending adjacent to the second portion 71b of the signal electrode 71, and a third portion 72c covering the surface of the substrate 41 at a region adjacent to the third portion 71c of the signal electrode 71. Thereby, the optical waveguide region 41, the first portion 71b of the signal electrode 71 and the first portion 72b of the ground electrode 72 form a first optical phase modulator 74 located at the upstream side of the optical path of the optical beam. Further, the optical waveguide branches 43 and 44, the second portion 71a of the signal electrode 71, and the second portion 72b of the ground electrode 72 form an optical amplitude modulator 73. In addition, the optical waveguide region 45, the third portion 71c of the signal electrode 71, and the third portion 72c of the ground electrode 72 form an optical phase modulator 75 provided at the downstream side of the optical path of the optical beam. Thereby, the foregoing lengths b and c are set such that a desired chirp is obtained. It should further be noted that the microwave signal produced by the signal source 50 is supplied to the signal electrode portion 72b at the upstream end thereof via the amplifier 51, while there is provided a terminating resistance $R_T$ at the downstream end of the signal electrode portion 71c. Thus the signal electrode 71 forms, together with the ground electrode 72, a traveling-wave electrode.

In operation, the incident optical beam experiences a phase modulation at the first optical phase modulator 74 and enters to the optical amplitude modulator 73. After amplitude modulation as well as slight phase modulation accompanied by the amplitude modulation in the optical amplitude modulator 73, the optical beam enters to the second optical phase modulator 75 and experiences a further phase modulation. Thereby, an optical output having a desired chirp is obtained in an optical output signal. In the optical modulator 70 of the present invention, both of the upstream side region and the downstream side region of the optical amplitude modulator 73 are used effectively for the optical phase modulation.

Figure 5:
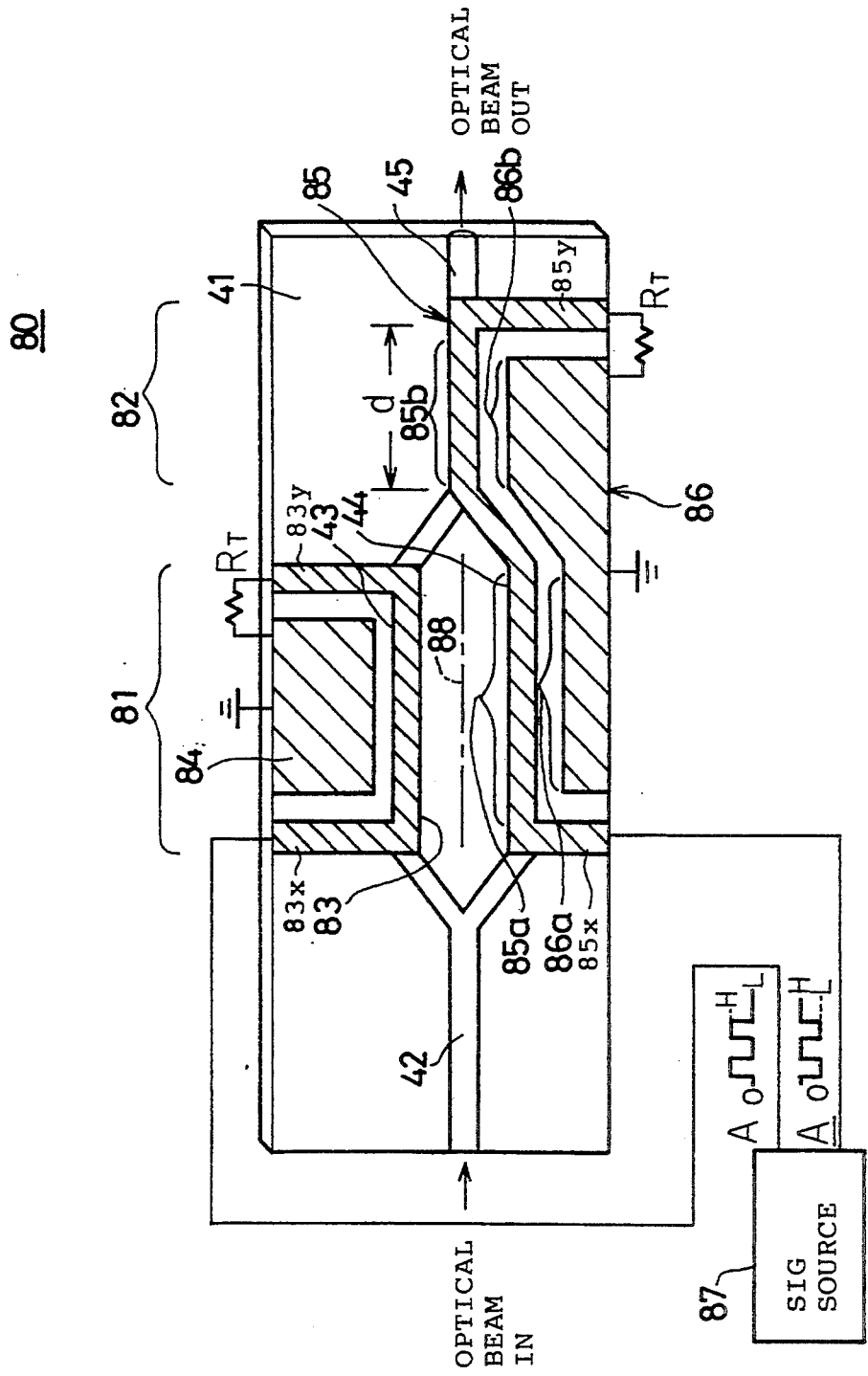
FIG. 5 is a diagram showing the construction of an optical modulator according to a fourth embodiment of the present invention.

FIG. 5 shows an optical modulator 80 according to a fourth embodiment of the present invention. In FIG. 5, those parts described previously are designated by the same reference numerals.

Referring to FIG. 5, the optical modulator 80 includes a first signal electrode 83 covering the optical waveguide branch 43 formed on the substrate 41 and a corresponding ground electrode 84 provided on the surface of the substrate 41 adjacent to the signal electrode 83 with a separation therefrom. In addition, there is provided a second signal electrode 85 wherein the signal electrode 85 includes a first portion 85a covering the optical waveguide branch 44 and a second portion 85b covering the optical waveguide region 45 with a length d. Further, there is provided another ground electrode 86 along the signal electrode 85 with a separation therefrom, such that the ground electrode 86 includes a first portion 86a corresponding to the first portion 85a of the signal electrode 85 and a second portion 86b corresponding to the second portion 85b of the optical waveguide 45. Further, there is provided an electric signal source 87 that produces microwave signals $A_0$ and $\overline{A_0}$ such that the signal $\overline{A_0}$ has a phase opposite to the phase of the signal $A_0$, wherein the electric signal source 87 supplies the microwave signal $A_0$ to the upstream end of the first signal electrode 83 and the signal $\overline{A_0}$ to the upstream end of the electrode portion 85a. It should be noted that the signal electrode 83 carries a contact electrode 83x at the upstream end thereof, with respect to the direction of propagation of the optical beams in the optical modulator 80, for receiving the electric signal A, as well as another contact electrode 83y at the downstream end, wherein the contact electrode 83y at the downstream end of the electrode 83 is connected to the ground by a terminating resistance $R_T$. Similarly, the electrode portion 85a has a contact electrode 85x at the upstream end thereof for receiving the electric signal $\overline{A_0}$. Further, the electrode portion 85b has another contact electrode 85y at the downstream end thereof such that the downstream end of the electrode portion 85b is connected to the ground via another terminating resistance $R_T$.

In the construction of the optical modulator 80, the signal electrode 83 and the corresponding ground electrode 84 are formed symmetrically, with respect to a hypothetical center line 88 between the optical waveguide branches 43 and 44, to the signal electrode portion 85a and the corresponding ground electrode portion 86a, and an optical amplitude modulator 81 is formed thereby. Similarly, the portion 85b of the signal electrode 85 and the portion 86b of the ground electrode 86 form an optical phase modulator 82. Further, the foregoing length d of the electrode portion 85b is set such that a desired chirp is obtained.

In operation, the input optical beam is subjected to an optical amplitude modulation in the optical amplitude modulator 81, with slight phase modulation associated with the amplitude modulation, and the modulated optical beam is then subjected to the phase modulation in the optical phase modulator 82. As a result of the modulation in the optical phase modulator 82, the optical output signal shows a desired chirp. As a result of use of the complementary signals $A_0$ and $\overline{A_0}$, one can reduce the drive voltage to one-half as compared with the optical modulator 40 of FIG. 2.

It should be noted that the construction of FIG. 5 that lacks the optical phase modulator, is already proposed. Although such a conventional construction is capable of changing the chirp continuously in response to the application of the electric signal, the chirp that the optical phase modulator provides can be varied only about zero. Further, the magnitude of chirp available in such a conventional device is limited by the voltage of the electric signal applicable to the substrate. In addition, one has to apply a large voltage signal continuously to the optical modulator in order to achieve a large chirp continuously.

In the construction of FIG. 5, it should be noted that the optical modulator 80 produces a large chirp $\alpha_0$ that is solely determined by the optical phase modulator 82 by supplying the signals $A_0$ and $\overline{A_0}$ such that the signals $A_0$ and $\overline{A_0}$ form complete complementary signals. Thus, one obtains a large chirp with a small drive voltage for the signals $A_0$ and $\overline{A_0}$. In addition, it is possible to change the chirp $\alpha_0$ continuously by changing the voltages applied to the electrodes 83 and 85. In other words, the optical modulator 80 not only produces a large chirp $\alpha_0$ but also provides the opportunity for fine tuning of the chirp.

Further, the signals to be supplied to the electrodes 83 and 85 are not limited to the complete complementary signals but may have different magnitudes. In addition, one obtains a desired chirp by merely supplying two pulse signals to the electrodes 83 and 85 with respective high levels and low levels, as long as the period is identical in both pulse signals. It should be noted that the foregoing applies also to the optical modulators 40, 60 and 70 described already.

Figure 6:
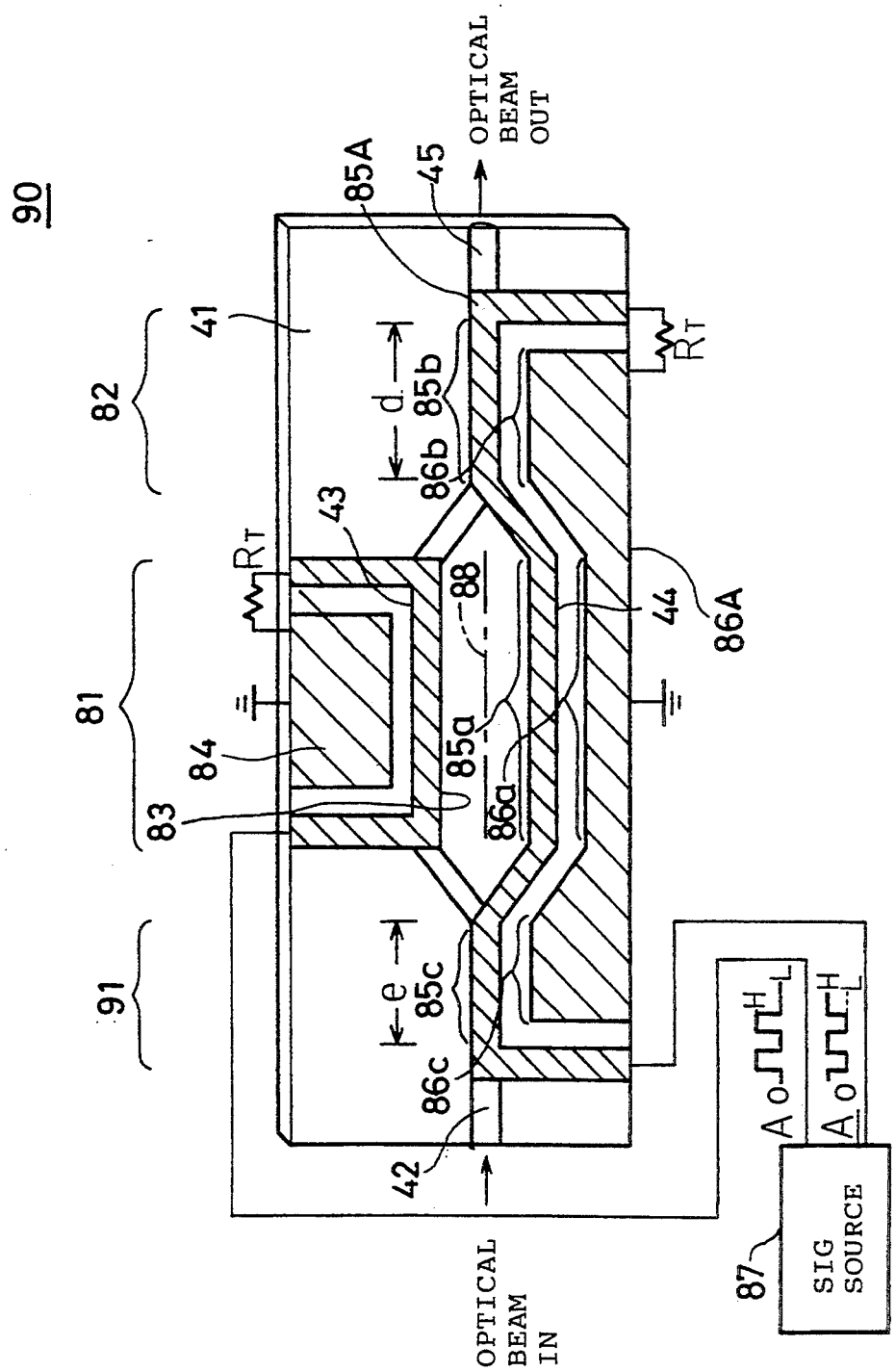
FIG. 6 is a diagram showing the construction of an optical modulator according to a fifth embodiment of the present invention.

FIG. 6 shows an optical modulator 90 according to a fifth embodiment of the present invention, wherein the optical modulator 90 of FIG. 6 is a modification of the optical modulator 80 of FIG. 5. Thus, those parts corresponding to the parts described already are designated by the same reference numerals.

Referring to FIG. 6, the signal electrode 85 is provided to have a portion 85c adjacent to the portion 85a at the side opposite to the portion 85b, such that the portion 85c of the electrode 85 covers the optical waveguide region 42 with a length e. In correspondence to the portion 85c, the ground electrode 86 has a portion 86c adjacent to the portion 86a at the side opposite to the side of the electrode portion 86b. Thereby, the electrode portions 85c and 86c form a second optical phase modulator 91, wherein the lengths d and e are set such that a desired chirp is obtained.

In operation, the incident optical beam supplied to the optical modulator 90 passes first through the optical waveguide region 42 and experiences an optical phase modulation in the optical phase modulator 91. It should be noted that the electric signal source 87 supplies the microwave signal $A_0$ to the upstream end of the electrode portion 85c with respect to the direction of passage of the optical beam through the optical modulator 90. The optical beam thus modulated enters to the optical amplitude modulator 81 for optical amplitude modulation as well as accompanied optical phase modulation. Further, the optical beam enters to the optical phase modulator 82 for further optical phase modulation. As a result, an output optical beam having a desired chirp is obtained in the optical waveguide 45. As the optical modulator 90 of FIG. 6 achieves the optical phase modulation by both the optical phase modulators 82 and 90, one obtains a large modulation depth for the optical phase modulation.

Figure 7:
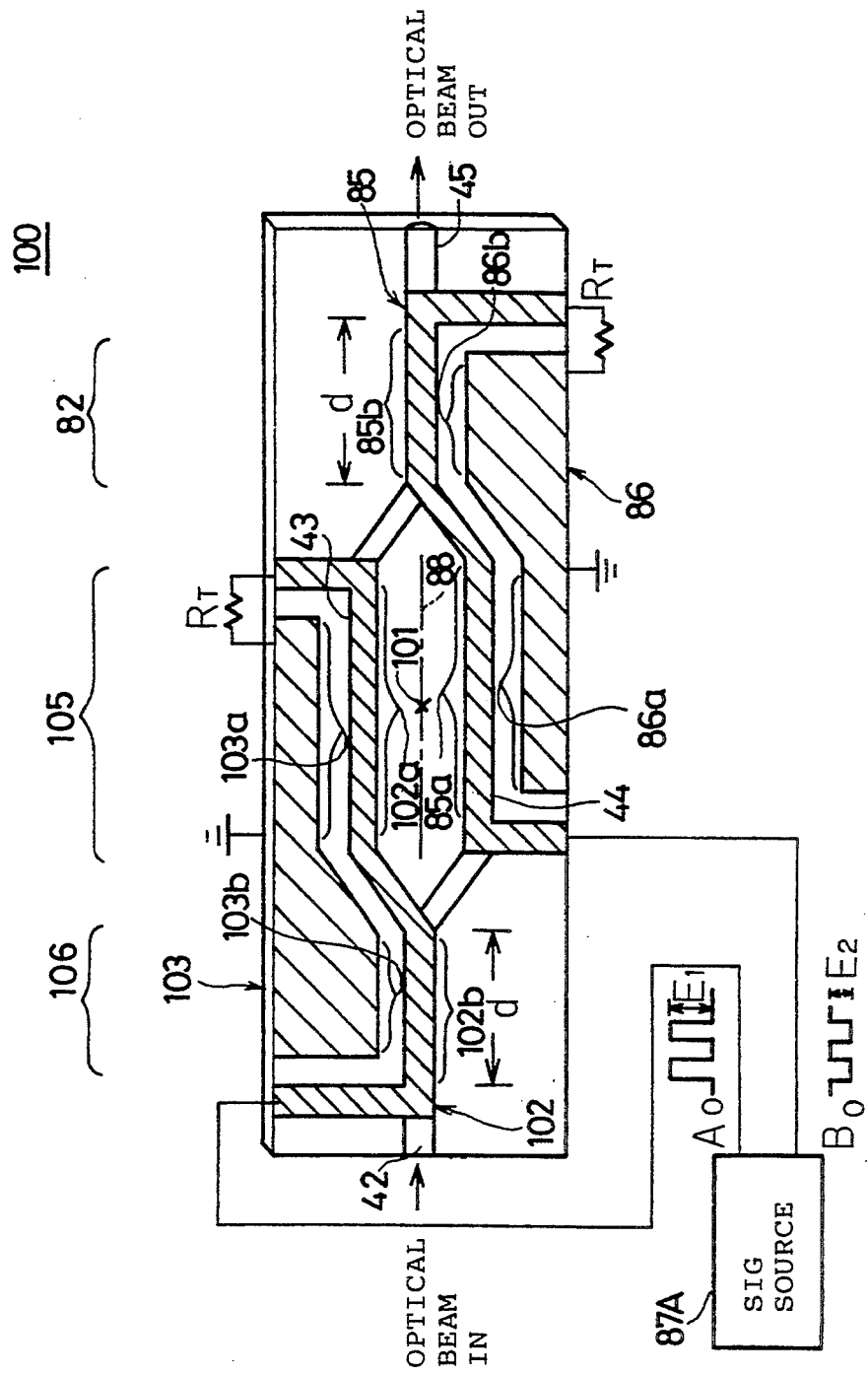
FIG. 7 is a diagram showing the construction of an optical modulator according to a sixth embodiment of the present invention.
Figure 8:
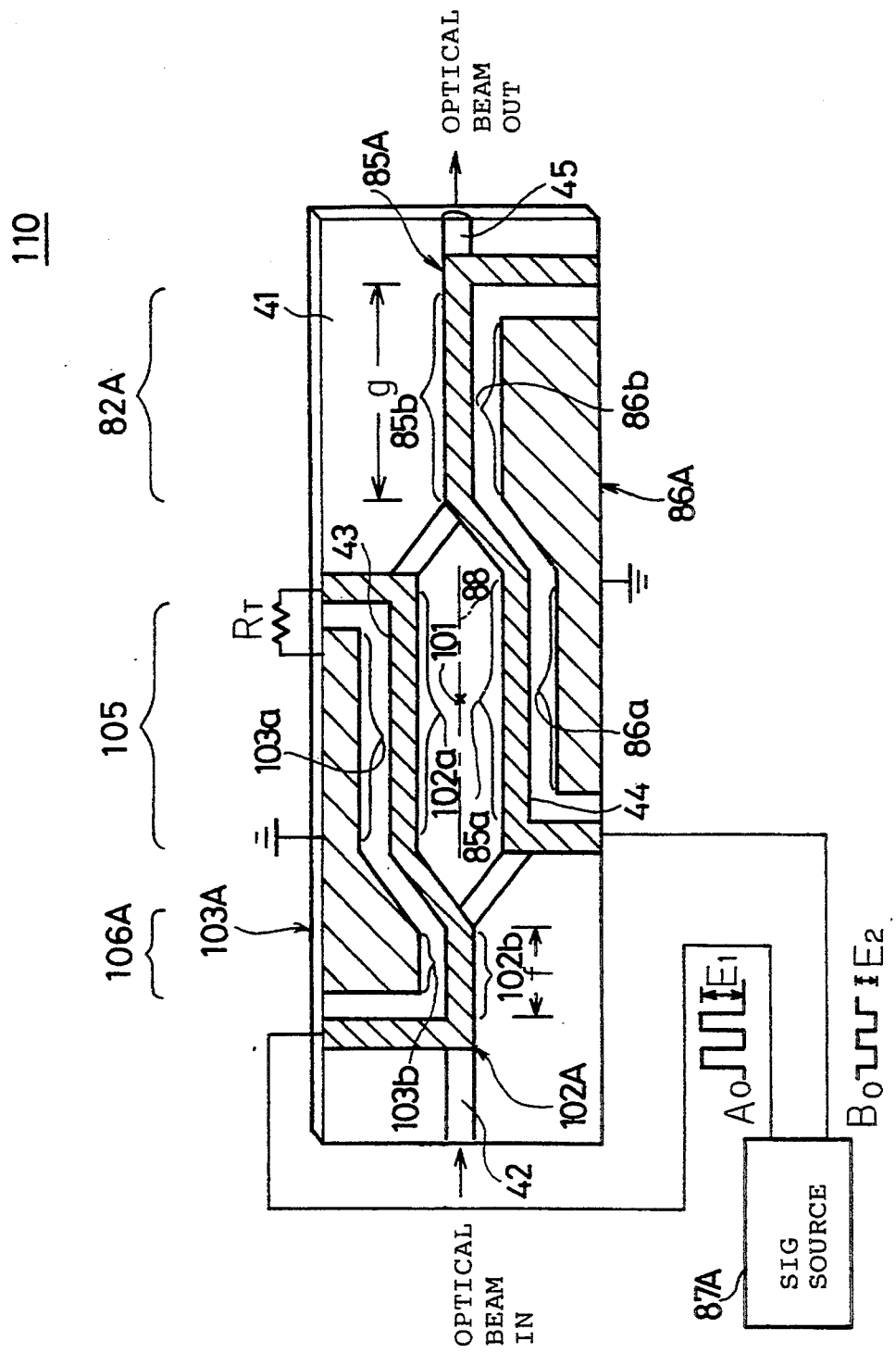
FIG. 8 is a diagram showing the construction of an optical modulator according to a seventh embodiment of the present invention.

Next, an optical phase modulator 100 according to a sixth embodiment of the present invention will be described with reference to FIG. 7. In FIG. 7, those parts described already are designated by the same reference numerals.

Referring to FIG. 7, the optical modulator 100 is a modification of the optical modulator 80 and includes a signal electrode 102 in place of the signal electrode 83 of FIG. 5, wherein the signal electrode 102 has a first portion 102a covering the optical waveguide branch 43 and a second portion 102b covering the optical waveguide region 42 with a length d. In correspondence to the signal electrode 102, there is provided a ground electrode 103 in place of the ground electrode 84, wherein the ground electrode 103 extends along the signal electrode 102 and includes a first region 102a covering the optical waveguide branch 102a and a second region 102b having a length d and covering the optical waveguide region 42. Thereby, the signal electrode 102 is provided symmetrically to the signal electrode 85 about a hypothetical point of symmetry 101 set on the hypothetical center line 88. Similarly, the ground electrode 103 is provided symmetrically to the ground electrode 86 about the hypothetical point 101. Thus, the length d of electrode portion 102b is identical with the length d of the electrode portion 85b. It should be noted that the electrode portion 102b forms, together with the corresponding ground electrode portion 103b, a first optical phase modulator 106, the electrode portions 102a and 85a form, together with the corresponding electrode portions 103a and 86a, an optical amplitude modulator 105, and the electrode portion 85b forms, together with the corresponding electrode portion 86b, the optical phase modulator 82 acting as a second optical phase modulator.

In operation, the electric signal source 87 produces a first modulation signal $A_0$ and a second modulation signal $B_0$ such that the phase of the signal $A_0$ is inverted with respect to the phase of the signal $B_0$, while the modulation signal $A_0$ has a level $E_1$ which may be different from a level $E_2$ of the signal $B_0$. The signal $A_0$ is supplied to the upstream end of the electrode portion 102b with respect to the direction of propagation of the optical beam through the optical modulator 100, while the signal $B_0$ is supplied to the upstream end of the electrode portion 85a as indicated. Further, the downstream end of the electrode portion 102a is shunted to the corresponding ground electrode portion 103b by the terminating resistance $R_T$, similarly to the electrode portion 85b.

Thus, the optical beam supplied to the optical modulator 100 experiences a first phase modulation in the optical phase modulator 105 with a magnitude corresponding to the level $E_1$ of the signal $A_0$ while propagating through the optical waveguide region 42 and an optical amplitude modulation in the optical amplitude modulator 105 while the optical beam is propagating through the optical waveguide branches 43 and 44. Further, the optical beam thus modulated experiences a further optical phase modulation in the optical phase modulator 82 with a magnitude corresponding to the level $E_2$ of the signal $B_0$, wherein the optical phase modulator 82 achieves the optical phase modulation in the direction opposite to the direction of the optical phase modulation achieved by the optical phase modulator 106. By changing the ratio between the levels $E_1$ and $E_2$ of the signals $A_0$ and $B_0$, one can adjust the magnitude of the chirp obtained by the optical modulator 100 as desired.

In the optical phase modulator 100, it should be noted that the magnitude of the optical phase modulation becomes zero when the level $E_1$ is set equal to the level $E_2$ due to the cancellation of the optical phase shift in the optical phase modulators 106 and 82. Thus, in the optical phase modulator 100, it becomes possible to adjust the magnitude of the chirp by setting the electric signal source 87A such that the electric signal source 87A produces the electric signals $A_0$ and $B_0$ with a predetermined ratio for the levels $E_1$ and $E_2$.

Next, an optical modulator 110 according to a seventh embodiment of the present invention will be described with reference to FIG. 7, wherein the optical modulator 110 is a modification of the optical modulator 100 such that the electrode portion 102b of the signal electrode has a length f that is different from the length of the electrode portion 85b, which now has a length g. In the illustrated example, the length f is set smaller than the length g.

In operation, the optical modulator 110 produces a chirp with the magnitude determined by the levels $E_1$ and $E_2$ of the signals $A_0$ and $B_0$ as well as by the ratio between the length f and the length g. Thus, in the event that the levels $E_1$ and $E_2$ are equal with each other, the magnitude of the phase modulation achieved by the optical phase modulator 82A exceeds the magnitude of the phase modulation achieved by the optical phase modulator 106A, and the optical phase modulator 110 produces a non-zero chirp. By adjusting the optical beam source 87A such that the levels $E_1$ and $E_2$ assume respective, predetermined levels, one can set the magnitude of the chirp as desired as a difference between the chirp achieved by the optical phase modulator 106A and the optical phase modulator 82A.

Next, an optical modulator 120 according to an eighth embodiment of the present invention will be described with reference to FIG. 9, wherein the optical modulator 120 is a modification of the optical modulator 80 of FIG. 5 in which a separate ground electrode 128 is provided on the surface of the substrate 41 so as to cover the exposed region between the signal electrodes 83 and 85. By providing the ground electrode 128, it is possible to eliminate the electric interference between the two signal electrodes 83 and 85. Further, the optical modulator 120 having such an additional electrode 128 has a feature in that the characteristic impedance is constant irrespective of the optical amplitude modulator 81 and the optical phase modulator 82. It should thereby by noted that the optical modulator 120 shows a substantially reduced characteristic impedance as a result of use of the ground electrode 128.

Figure 9:
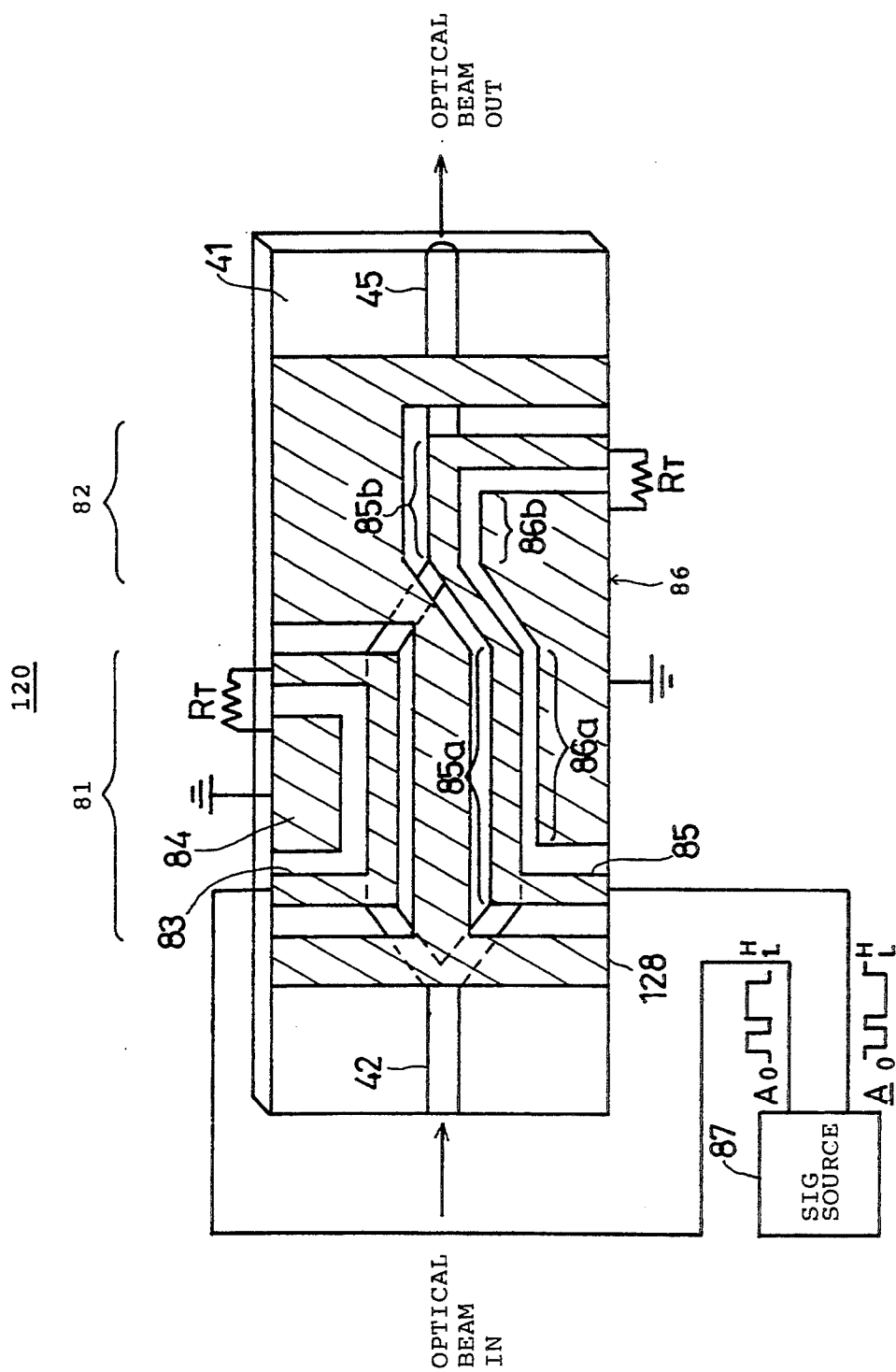
FIG. 9 is a diagram showing the construction of an optical modulator according to an eighth embodiment of the present invention.
Figure 10:
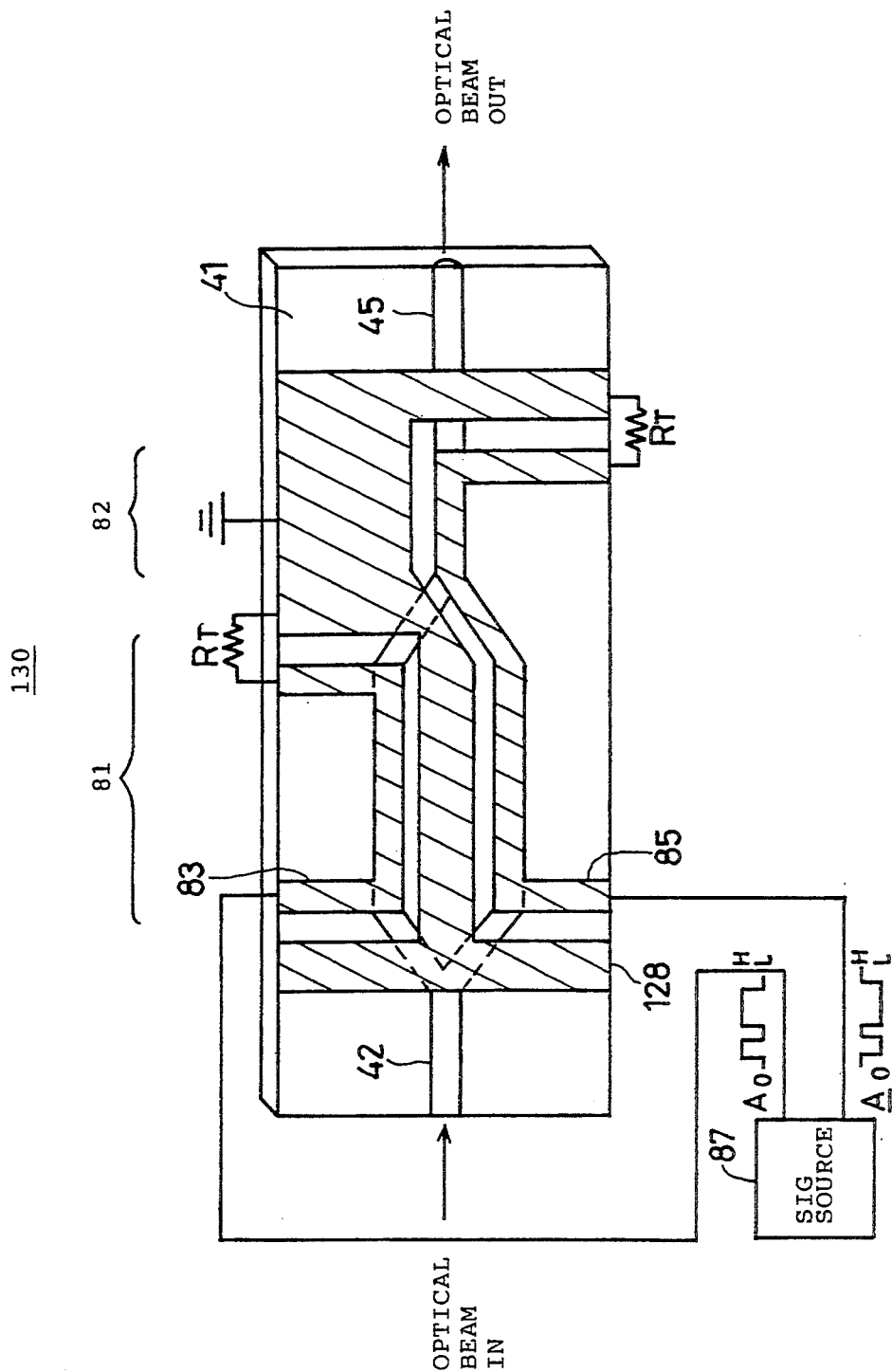
FIG. 10 is a diagram showing the construction of an optical modulator according to a ninth embodiment of the present invention.
Figure 11:
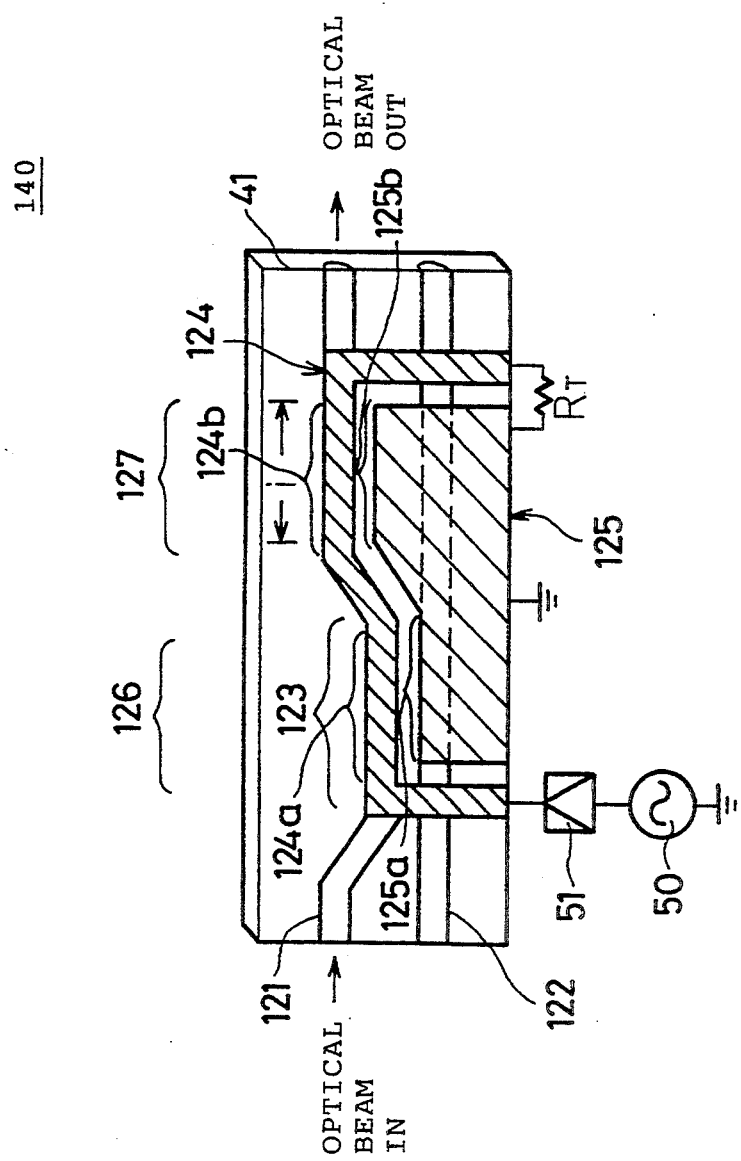
FIG. 11 is a diagram showing the construction of an optical modulator according to a tenth embodiment of the present invention.

FIG. 11 shows an optical modulator 130 according to a ninth embodiment of the present invention, wherein the optical modulator 130 is a modification of the optical modulator 120 of FIG. 9 in that the ground electrodes 84 and 86 are removed. The construction of the optical modulator 130 is still effective for eliminating the interference between the signal electrodes 83 and 85 similarly to the device 120 of FIG. 9, while one can maintain a high impedance as compared with the device 120 due to the construction of providing the ground electrode 128 only at one side of the signal electrode 83 or 85. In addition, the optical modulator 130 retains the feature of uniform characteristic impedance throughout the optical amplitude modulator 81 and the optical phase modulator 82.

FIG. 11 shows an optical modulator 140 according to a tenth embodiment of the present invention that uses optical waveguides forming an optical directional coupler.

Referring to FIG. 11, the optical modulator 140 includes optical waveguides 121 and 122 formed on the substrate 41, wherein the optical waveguides 121 and 122 form an optical directional coupler 123 in correspondence to the part of the substrate where the optical waveguides 121 and 122 are disposed with a reduced separation.

On the surface of the substrate 41, a signal electrode 124 is provided so as to cover the optical waveguide 121, wherein the signal electrode 124 includes a portion 124a covering a part of the optical waveguide 41 that forms the optical directional coupler 123, and a portion 124b covering the optical waveguide 121 at the downstream part of the electrode portion 124a. In addition, there is provided a ground electrode 125 to extend along the signal electrode 124 over the second optical waveguide 122. Thereby, the ground electrode 125 includes a first portion 125a corresponding to the electrode portion 124a, and a second portion 125b corresponding to the electrode portion 124b, wherein the portion 125a of the ground electrode 124 forms, together with the signal electrode portion 124a, an optical amplitude modulator 126. Further, the portion 124b of the signal electrode 124 forms an optical phase modulator 127 together with the portion 125b of the ground electrode 125. The signal electrode 124 is formed such that the electrode portion 124b has a length i corresponding to the desired magnitude of the chirp obtained by the optical modulator 140.

In the description heretofore with respect to the first through tenth embodiments, it should be noted that a Z-cut $LiNbO_3$ substrate is used for the substrate 41. Thus, the optical modulators described heretofore employs the change of refractive index with respect to the TM mode optical beams propagating through the optical waveguide forming in the substrate 41, for the optical modulation. For this purpose, the signal electrodes such as the signal electrode 48 of FIG. 2 has been provided immediately above the corresponding optical waveguide. On the other hand, there exist crystals that provide a large refractive index change between the electrodes provided on the crystal surface rather than the large refractive index change immediately below the electrode. In such a case, the signal electrodes and the ground electrodes are formed on the surface of the substrate at both lateral sides of the optical waveguide as indicated in FIG. 12.

Figure 12:
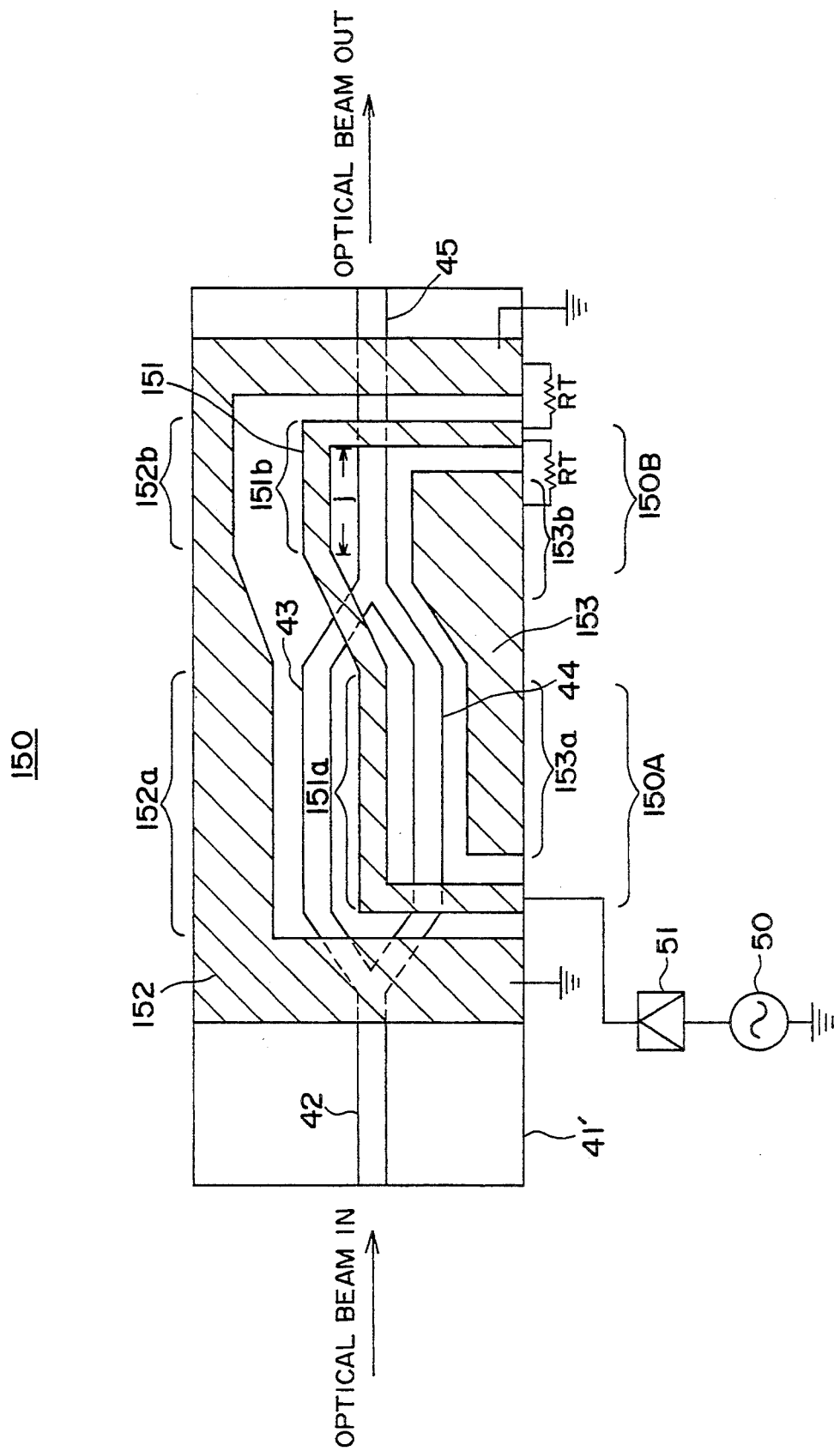
FIG. 12 is a diagram showing the construction of an optical modulator according to an eleventh embodiment of the present invention.

Referring to FIG. 12 showing an optical modulator 150 according to an eleventh embodiment of the present invention, the optical modulator 150 is provided on an X-cut $LiNbO_3$ substrate 41' on which the optical waveguide regions 42 and 45 are provided together with the optical waveguide branches 43 and 44 intervening therebetween, wherein a signal electrode 151, formed of an electrode portion 151a and an electrode portion 151b, is provided such that the electrode portion 151a extends between the optical waveguide branches 43 and 44 and the electrode portion 151b extends at a side of the optical waveguide region 45 with a length j.

At a side of the optical waveguide branch 44 opposite to the side of the signal electrode 151, there is provided a first ground electrode 153 formed of an electrode portion 153a corresponding to the electrode portion 151a and an electrode portion 153b corresponding to the electrode portion 151b. Similarly, there is provided another ground electrode 152 at a side of the optical waveguide branch 43 opposite to the side of the signal electrode 151, wherein the ground electrode 152 includes a first region 152a corresponding to the electrode portion 151a and a second region 152b corresponding to the electrode portion 151b. The electrodes 151 and 152 as well as the electrodes 151 and 153 are shunted at respective downstream ends by a terminating resistance $R_T$ with respect to the direction of propagation of the optical beams through the substrate 41', and an electric signal is applied to the signal electrode 151 at an upstream end thereof. In such a construction, the electrode portion 151a of the signal electrode 151 and the corresponding electrode portions 152a and 153a of the ground electrode form an optical amplitude modulator 150A, while the electrode portion 151b of the signal electrode 151 as well as the corresponding electrode portions 152b and 153b form an optical phase modulator 150B. The optical phase modulator 150B has a length j corresponding to the length of the electrode portion 151b and provides a chirp corresponding to the length j. It should be noted that the optical modulator 150 of FIG. 12 interacts with TE-mode optical beams guided along the optical waveguide.

Further, the optical modulator of the present invention may employ a total reflection optical switch. Alternatively, the present invention is applicable to the optical modulators that use optical absorption for optical modulation. Further, the substrate of the optical modulator of the present invention may be a semiconductor substrate, as long as the substrate shows an electro-optic effect such as a change of refractive index or optical absorption in response to the application of voltage.

Further, the present invention is not limited to the embodiments described heretofore, but various variations and modifications may be made without departing from the scope of the invention.

What is claimed is:

1. An optical modulator, comprising:
   a substrate showing an electro-optic effect;
   an optical waveguide provided on said substrate for guiding an optical beam therethrough, said optical waveguide including a first region and a second, different region cascaded with each other for consecutively passing said optical beam;
   signal electrode means provided on said substrate in the vicinity of said optical waveguide for receiving an electric signal, said signal electrode means including a first region and a second, different region respectively corresponding to said first and second regions of said optical waveguide;
   ground electrode means provided on said substrate in separation from said signal electrode means, said ground electrode including a first region and a second, different region respectively corresponding to said first and second regions of said optical waveguide;
   said first region of said optical waveguide, said first region of said signal electrode means, and said first region of said ground electrode means forming an optical amplitude modulator for modulating an amplitude of said optical beam propagating through said optical waveguide;
   said second region of said optical waveguide, said second region of said signal electrode means and said second region of said ground electrode means forming an optical phase modulator for modulating a phase of said optical beam propagating through said optical waveguide;
   said second region of said signal electrode means having a size, along said optical waveguide, corresponding to a desired magnitude of chirp caused in said optical beam by said optical modulator;
   said signal electrode means comprising an electrode strip extending continuously form said first region to said second region of said signal electrode means.

2. An optical modulator as claimed in claim 1, wherein said electrode strip forms a traveling-wave electrode extending continuously between a first end included in said first region of said signal electrode means and a second end included in said second region of said signal electrode means, said traveling-wave electrode further includes a terminating resistance (RT) provided at said first end of said traveling-wave electrode in connection to said ground electrode means, and a terminal region provided at said second end of said traveling-wave electrode for receiving said electric signal.

3. An optical modulator as claimed in claim 2, wherein said optical modulator further includes an electric signal source for supplying said electric signal to said terminal region of said signal electrode means.

4. An optical modulator as claimed in claim 3, wherein said optical amplitude modulator is disposed at a downstream side, with respect to a propagating direction of said optical beam through said substrate, of said optical phase modulator.

5. An optical modulator as claimed in claim 3, wherein said optical amplitude modulator is disposed at an upstream side, with respect to a propagating direction of said optical beam through said substrate, of said optical phase modulator.

6. An optical modulator as claimed in claim 1, wherein said optical waveguide further includes a third region adjacent to said first region of said optical waveguide at a side opposite to said second region of said optical waveguide, said signal electrode means includes a third region adjacent to said first region of said signal electrode means at a side opposite to said second region of said signal electrode means, and said ground electrode means includes a third region adjacent to said first region of said ground electrode means at a side opposite to said second region of said ground electrode means, wherein said third region of said optical waveguide, said third region of said signal electrode means and said third region of said ground electrode means form a second optical phase modulator.

7. An optical modulator as claimed in claim 1, wherein said optical waveguide includes first and second branches merging with each other at respective first and second ends to form a Mach-Zehnder interferometer, said first and second branches being included in said first region of said optical waveguide,
   said electrode strip forming said signal electrode means includes a first portion extending over said first branch of said optical waveguide and a second portion continuing to said first portion and extending over said second region of said optical waveguide, said first and second portions thereby forming a first electrode strip, said signal electrode means further including a second, different electrode strip extending over said second branch of said optical waveguide in said first region of said optical waveguide, and
   said ground electrode means comprises a first electrode strip extending along said first electrode strip of said signal electrode means from said first portion to said second portion of said first electrode strip, and a second electrode strip extending along said second electrode strip of said signal electrode means in correspondence to said first portion of said signal electrode strip.

8. An optical modulator as claimed in claim 7, wherein said optical modulator further includes a signal source provided such that the signal source supplies said electric signal to said first and second electrode strips of said signal electrode means with mutually opposite phases.

9. An optical modulator as claimed in claim 7, wherein said optical modulator further includes a ground electrode strip on said substrate such that said ground electrode strip covers a surface of said substrate between said first and second electrode strips.

10. An optical modulator as claimed in claim 1, wherein said optical waveguide includes first and second branches merging with each other at respective first and second ends to form a Mach-Zehnder interferometer, said first and second branches being included in said first region of said optical waveguide, said optical waveguide further including a third region adjacent to said first region of said optical waveguide at a side opposite to said second region of said optical waveguide, said electrode strip forming said signal electrode means includes a first portion extending over said first branch of said optical waveguide and a second portion extending over said second region of said optical waveguide, said first and second portions thereby forming a first electrode strip, said signal electrode means further including a second, different electrode strip including a first portion extending over said second branch of said optical waveguide in said first region of said optical waveguide and a second portion extending over said third region of said optical waveguide, said ground electrode means comprises a first electrode strip extending along said first electrode strip of said signal electrode means from said first portion to said second portion of said first electrode strip, and a second electrode strip extending along said second electrode strip of said signal electrode means from said first portion to said second portion of said second electrode strip, wherein said second portion of said first electrode strip and said second portion of said second electrode strip have an identical length.

11. An optical modulator as claimed in claim 1, wherein said optical waveguide includes first and second branches merging with each other at respective first and second ends to form a Mach-Zehnder interferometer, said first and second branches being included in said first region of said optical waveguide, said optical waveguide further including a third region adjacent to said first region of said optical waveguide at a side opposite to said second region of said optical waveguide, said electrode strip forming said signal electrode means includes a first portion extending over said first branch of said optical waveguide and a second portion extending over said second region of said optical waveguide, said first and second portions thereby forming a first electrode strip, said signal electrode means further including a second, different electrode strip including a first portion extending over said second branch of said optical waveguide in said first region of said optical waveguide and a second portion extending over said third region of said optical waveguide, said ground electrode means comprises a first electrode strip extending along said first electrode strip of said signal electrode means from said first portion to said second portion of said first electrode strip, and a second electrode strip extending along said second electrode strip of said signal electrode means from said first portion to said second portion of said second electrode strip, wherein said second portion of said first electrode strip and said second portion of said second electrode strip have respective lengths that are different from each other.

12. An optical modulator as claimed in claim 1, wherein said optical waveguide includes a third region adjacent to said first region of said optical waveguide at a side opposite to said second region of said optical waveguide, said first electrode strip of said signal electrode means further includes a third portion adjacent to and in continuation with said first portion at a side opposite to said second portion of said first electrode strip, such that said third portion of said electrode strip covers said third region of said optical waveguide, said ground electrode means extends along said first electrode strip of said signal electrode means from said first portion to said third portion of said first electrode strip.

13. An optical modulator as claimed in claim 1, wherein said optical waveguide includes first and second branches merging with each other at respective first and second ends to form a Mach-Zehnder interferometer, said first and second branches being included in said first region of said optical waveguide, said electrode strip forming said signal electrode means includes a first portion extending over said first branch of said optical waveguide and a second portion continuing to said first portion and extending over said second region of said optical waveguide, said first and second portions thereby forming a first electrode strip, said signal electrode means further including a second, different electrode strip extending over said second branch of said optical waveguide in said first region of said optical waveguide, and said ground electrode means comprises a single electrode strip extending over a surface of said substrate along to and between said first and second electrode strips of said signal electrode means.

14. An optical modulator as claimed in claim 1, wherein said first region of said optical waveguide comprises first and second optical waveguides merging at respective first and second ends to form a Mach-Zehnder interferometer.

15. An optical modulator as claimed in claim 1, wherein said first region of said optical waveguide comprises first and second optical waveguides forming an optical directional coupler on a surface of said substrate.

16. An optical modulator as claimed in claim 1, wherein said substrate comprises a Z-cut $LiNbO_3$ crystal.

17. An optical modulator as claimed in claim 16, wherein said signal electrode means and said ground electrode means are provided to cover said optical waveguide.

18. An optical modulator as claimed in claim 1, wherein said substrate comprises an X-cut $LiNO_3$ crystal.

19. An optical modulator as claimed in claim 18, wherein said signal electrode means and said ground electrode means are disposed on said substrate at both sides of said optical waveguide such that said optical waveguide is located between said signal electrode means and said ground electrode means.

* * * * *